US007090446B2

(12) United States Patent
Chen

(10) Patent No.: US 7,090,446 B2
(45) Date of Patent: Aug. 15, 2006

(54) OPTICAL LENS DRILL PRESS

(76) Inventor: Daniel Chen, 37-11 59th St., Woodside, NY (US) 11377

( * ) Notice: Subject to any disclaimer, the term of this patent is extended or adjusted under 35 U.S.C. 154(b) by 0 days.

(21) Appl. No.: 10/812,195

(22) Filed: Mar. 29, 2004

(65) Prior Publication Data

US 2005/0214083 A1 Sep. 29, 2005

(51) Int. Cl.
*B23B 39/00* (2006.01)

(52) U.S. Cl. .......................... 408/89; 408/91; 408/103

(58) Field of Classification Search .................. 408/89, 408/91, 103, 110, 136, 234; 269/91, 94; 451/384, 390
See application file for complete search history.

(56) References Cited

U.S. PATENT DOCUMENTS 2,948,168 A * 8/1960 McCormick ................ 408/69
3,200,470 A * 8/1965 Muller ........................ 408/89
3,782,847 A * 1/1974 Kulzer ....................... 408/1 R
5,507,605 A * 4/1996 Bae ............................ 408/89
5,634,748 A * 6/1997 Brazell et al. ............... 408/89
5,722,647 A * 3/1998 Rattaro et al. ............... 269/45
5,865,576 A * 2/1999 Arai et al. .................. 409/201
6,712,565 B1 * 3/2004 Wehmeier .................... 408/91

FOREIGN PATENT DOCUMENTS

JP 57194808 A * 11/1982
JP 09038955 A * 2/1997

* cited by examiner

*Primary Examiner*—Derris H. Banks
*Assistant Examiner*—J Williams
(74) *Attorney, Agent, or Firm*—Michael I Kroll

(57) ABSTRACT

An optical lens drill press outfitted with specialized lens holding and displacement platform assemblies that allow the user to manipulate the angle and hold lenses in position, whereby selected areas pre-designated for the fabrication of apertures can be produced at precision angles and sizes typically perpendicular to the curvature lens of the lens.

14 Claims, 17 Drawing Sheets

OPTICAL LENS DRILL PRESS

BACKGROUND OF THE INVENTION

1. Field of the Invention

The present invention relates generally to a drill press and, more specifically, to a drill press designed to facilitate drilling apertures though the irregular curvature shape of an eyeglass lens.

The present invention eyeglass lens drill press is outfitted with specialized lens holding and displacement platform assemblies that allow the user to manipulate the angle and hold lenses in position, whereby selected areas pre-designated for the fabrication of holes or apertures can be produced at precision angles and sizes typically perpendicular to the lens's arc.

The drill press contains a fixed stand that supports a vertical column that is affixed to a motorized drill. An adjustment knob allows the motorized drill to transverse along the vertical column to a user defined position above the fixed stand. The fixed stand supports independent right and left holding platforms that enable the user to define the proper lens position for drilling precision angles and sizes typically perpendicular to the lens's arc. The lenses are held between an upper and lower cup member having a threaded member for securing the lens therebetween.

In addition to vertical adjustment, the motorized drill press is pivotal about the vertical column to allow for improved accessibility to the holding platforms. The drill press is rotated 90 degrees away from the platform to provide the user means for loading and unloading of the optical lenses. A turn knob allows the drill to pivot freely when disengaged and locks the drill in a fixed position when engaged. A positioning block with a milled grove ensures the drill is centered over the holding platforms allowing proper working position.

The drill press of the present invention provides means for a plurality of lateral and rotational movements. Conjointly the right and left platforms may be repositioned about the drill bit in both the x-axis and z-axis planes. In addition, the platforms may conjointly be pivoted lengthwise (forward and backward) relative to the horizontal axis.

The drill press of the present invention also provides means for independent movement of the platforms relative to one another. The dual platforms allow the user to drill both lenses without angular repositioning.

These conjoined and independent movements of the lens support platforms provide means for precision positioning of each lens allowing the user to properly orient the lens for perpendicular placement of apertures within the lens's arc.

The eyeglass lens drill press of the present invention provides means for the user to precisely control each of the conjoined and independent lateral and angular movements. Measurable scales are affixed to the platforms to specifically define the lateral and angular positions in relationship to the x, y, and z axis.

Utilizing a threaded member the user first secures each lens between the upper and lower elements of the lens holding device, whereupon adjustment knobs are then employed to reposition the lenses in selective lateral and angular directions allowing fabrication of apertures at precise angles.

2. Description of the Prior Art

Drill presses for eyeglass lenses have been provided in prior art. While these units may be suitable for the particular purpose to which they address, they would not be as suitable for the purposes of the present invention as heretofore described.

SUMMARY OF THE PRESENT INVENTION

A primary object of the present invention is to provide an improved drill press that accommodates the perpendicular positioning of unique curvatures of eyeglass lenses.

Another object of the present invention is to provide an improved drill press that provides dual securing members.

Yet another object of the present invention is to provide an improved drill press that provides conjoined lateral adjustment of dual platform members in the X-axis direction.

Still another object of the present invention is to provide an improved drill press that provides conjoined lateral adjustment of dual platform members in the Z-axis direction.

Yet another object of the present invention is to provide an improved drill press that provides conjoined angular adjustment of dual platform members along the horizontal axis.

One more object of the present invention is to provide an improved drill press that provides independent angular adjustment of dual platform members along the horizontal axis.

Still another object of the present invention is to provide an improved drill press that allows the drill to pivot away from the working surfaces for ease of lens setup and removal.

Yet another object of the present invention is to provide an improved eyeglass lens drill press that is simple and easy to use.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWING FIGURES

In order that the invention may be more fully understood, it will now be described, by way of example, with reference to the accompanying drawing in which.

Figure 12:
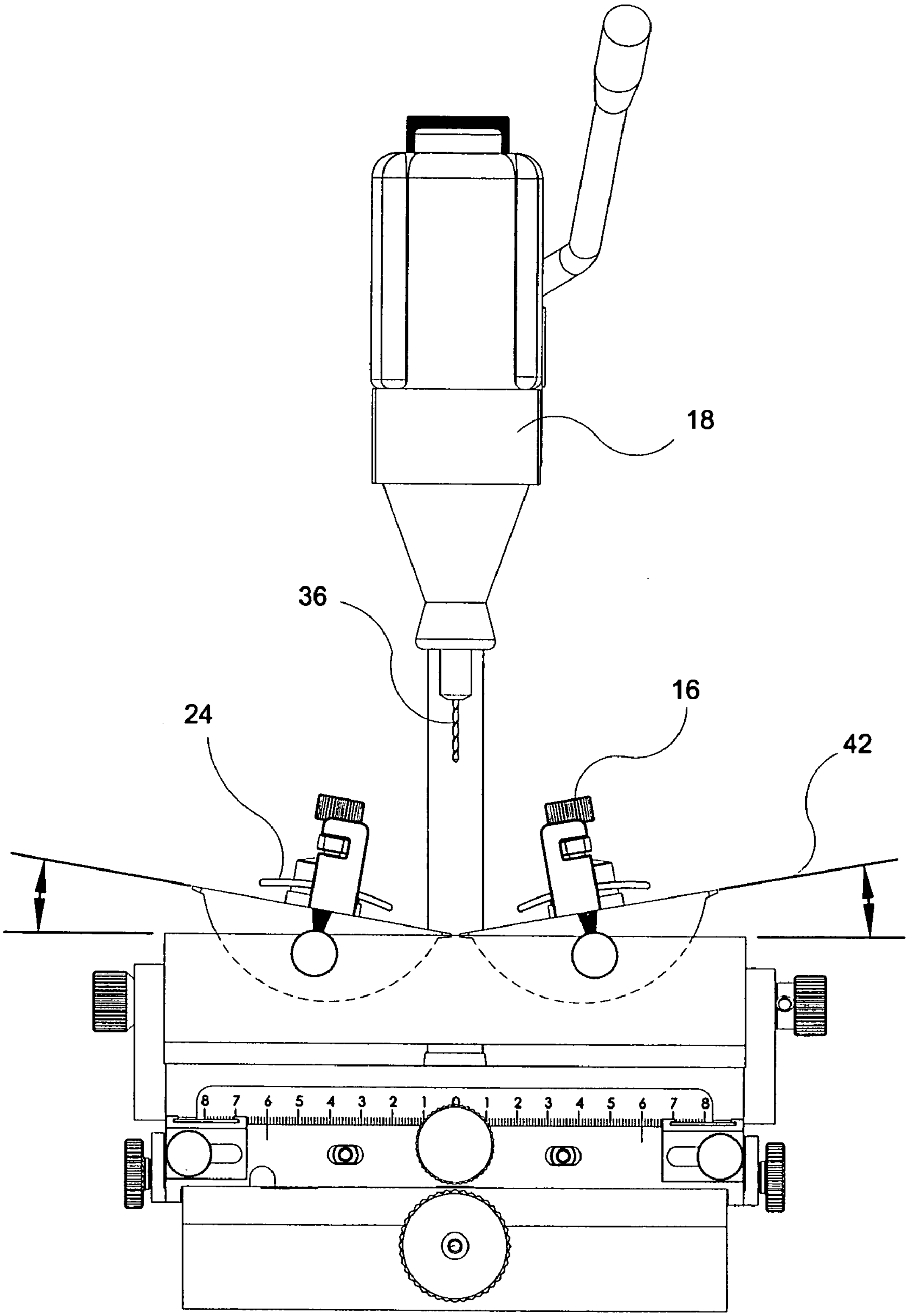
Figure 13:
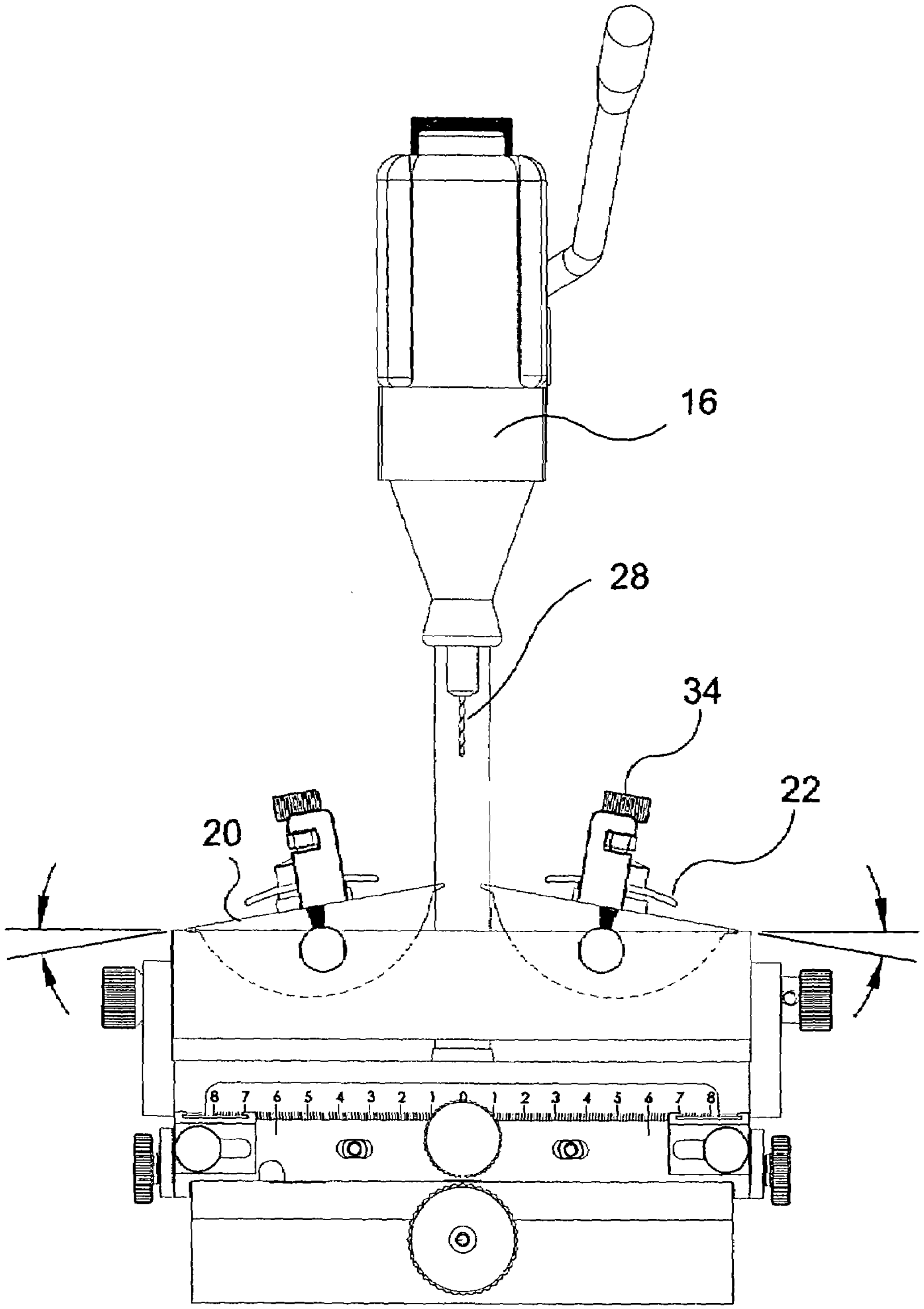
Figure 14:
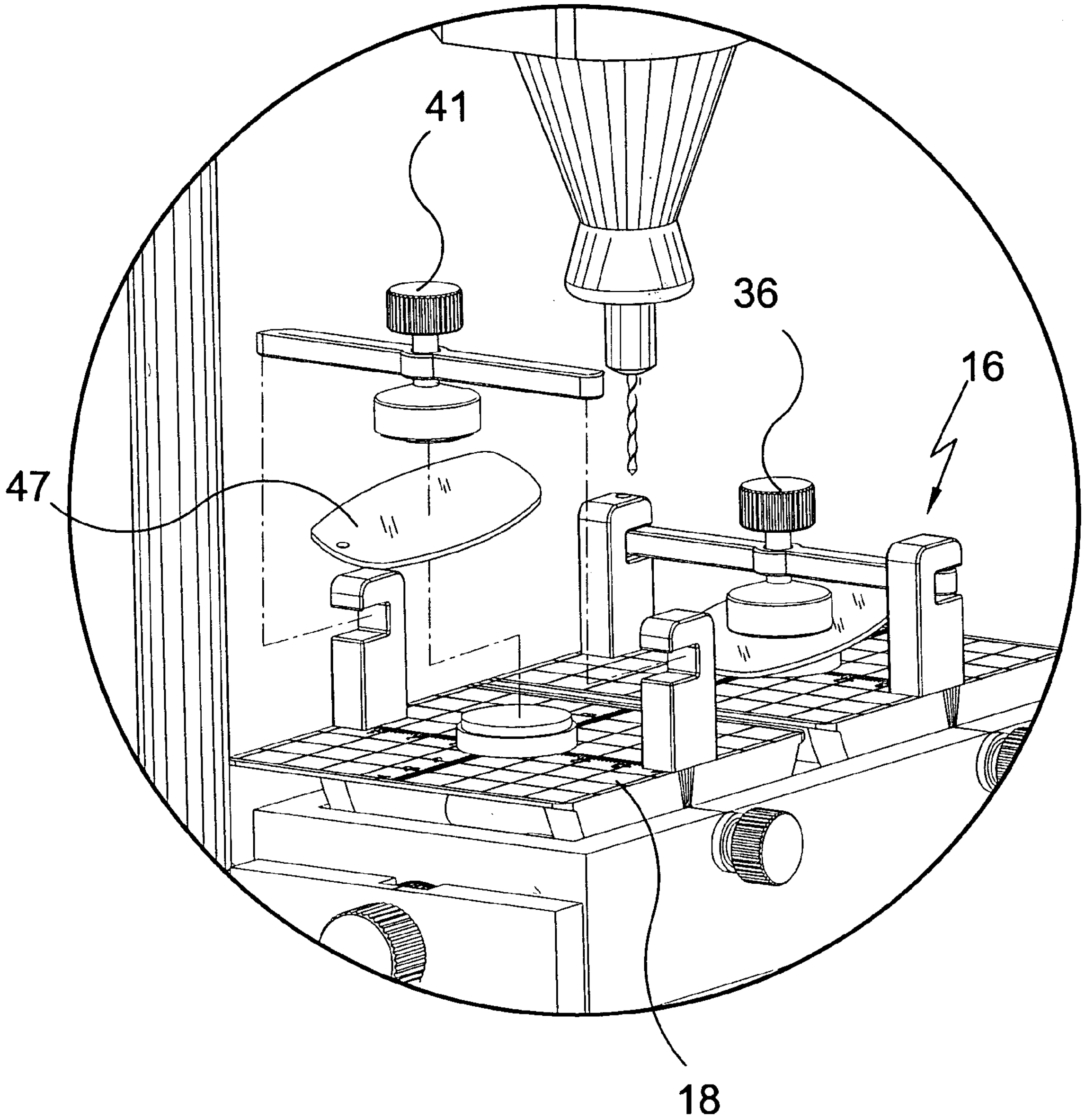
Figure 15:
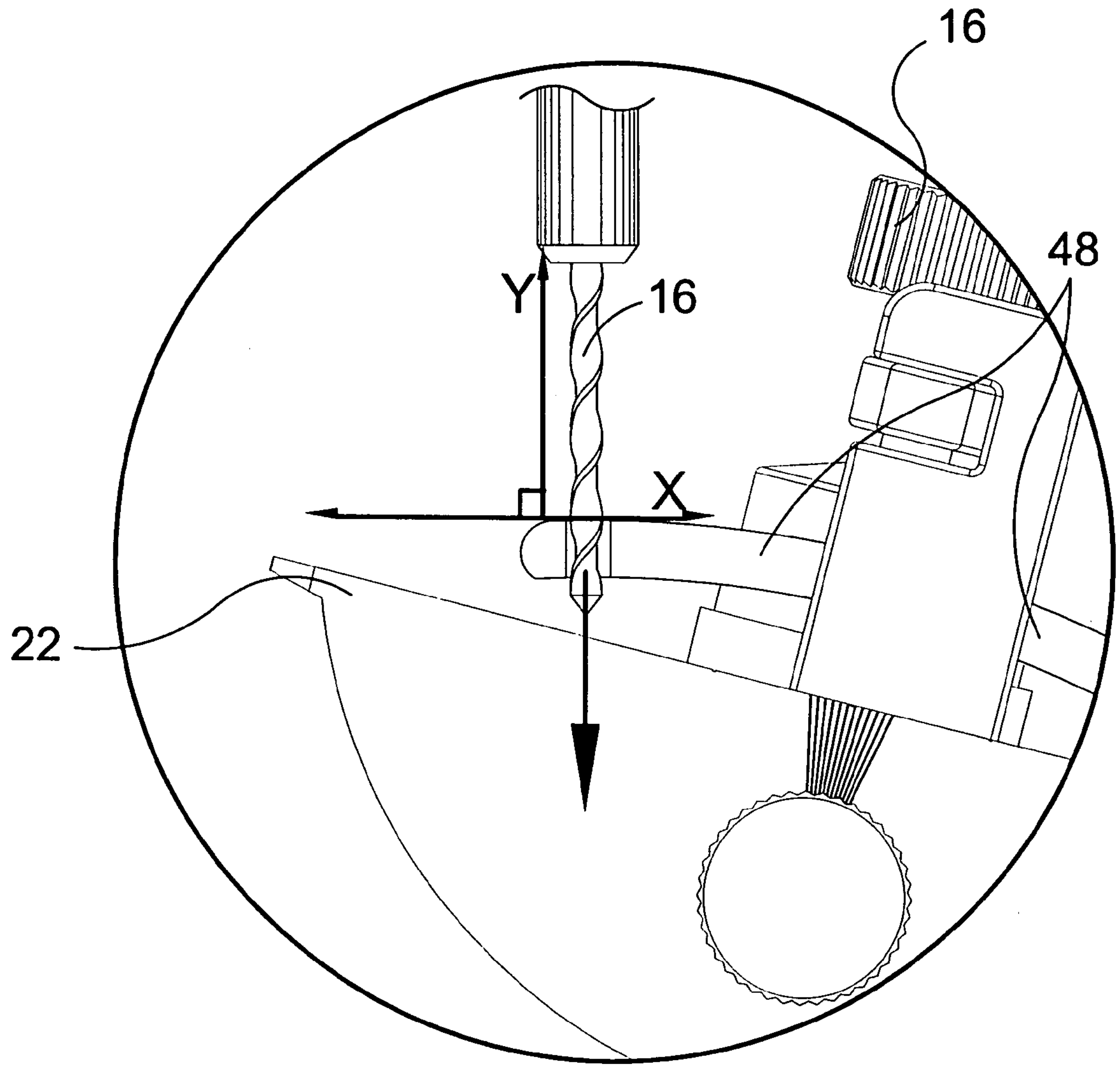
Figure 16:
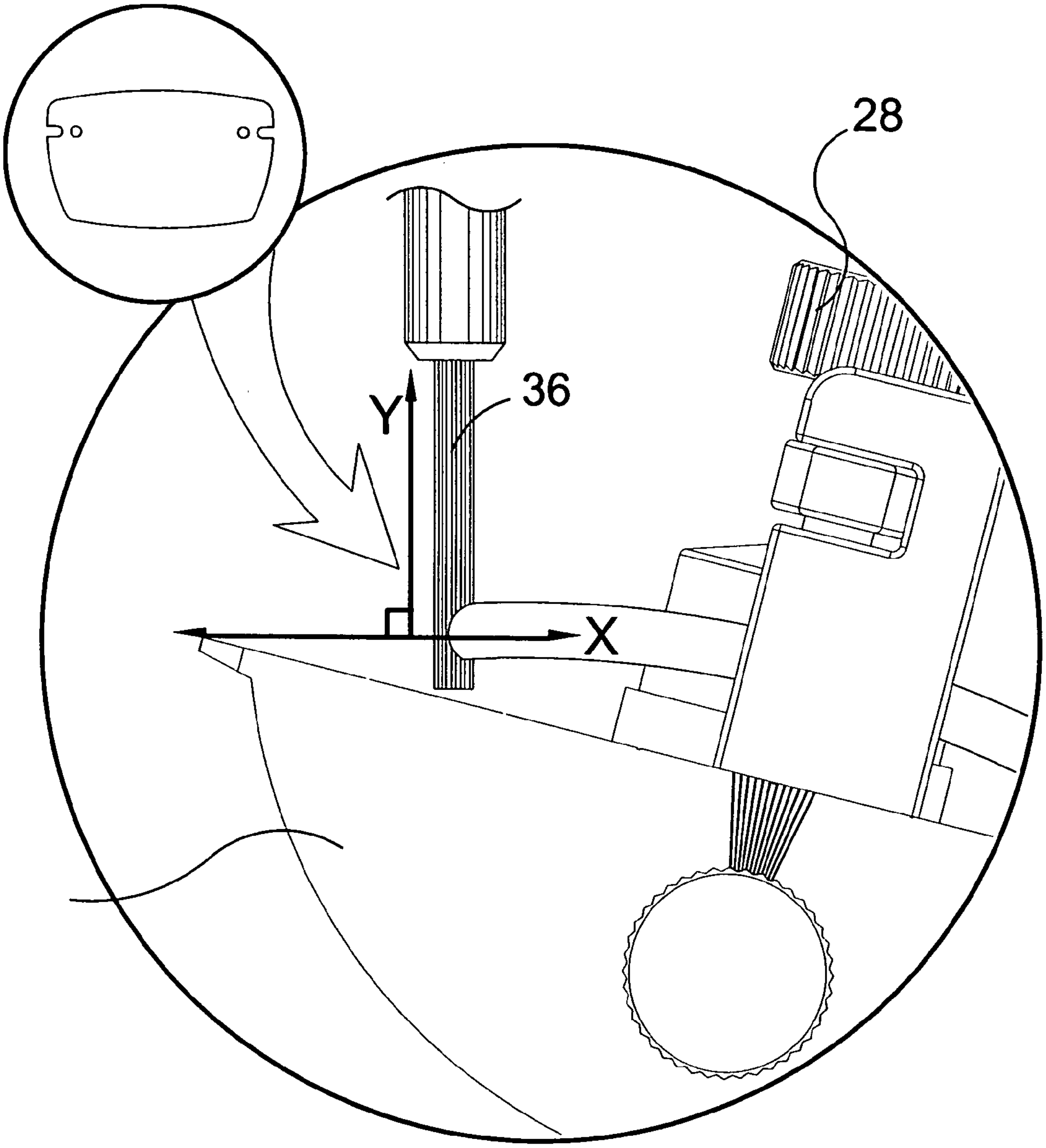

FIG. 12 a front view of the present invention's centering platform x-axis pivot;

FIG. 13 is a front view of the present invention's centering platform x-axis pivot;

FIG. 14 is an exploded view of the holding element and lens;

FIG. 15 is a detailed view of the drilling process of the present invention;

FIG. 16 is a detailed view of the cutting process of the present invention; and

Figure 17:
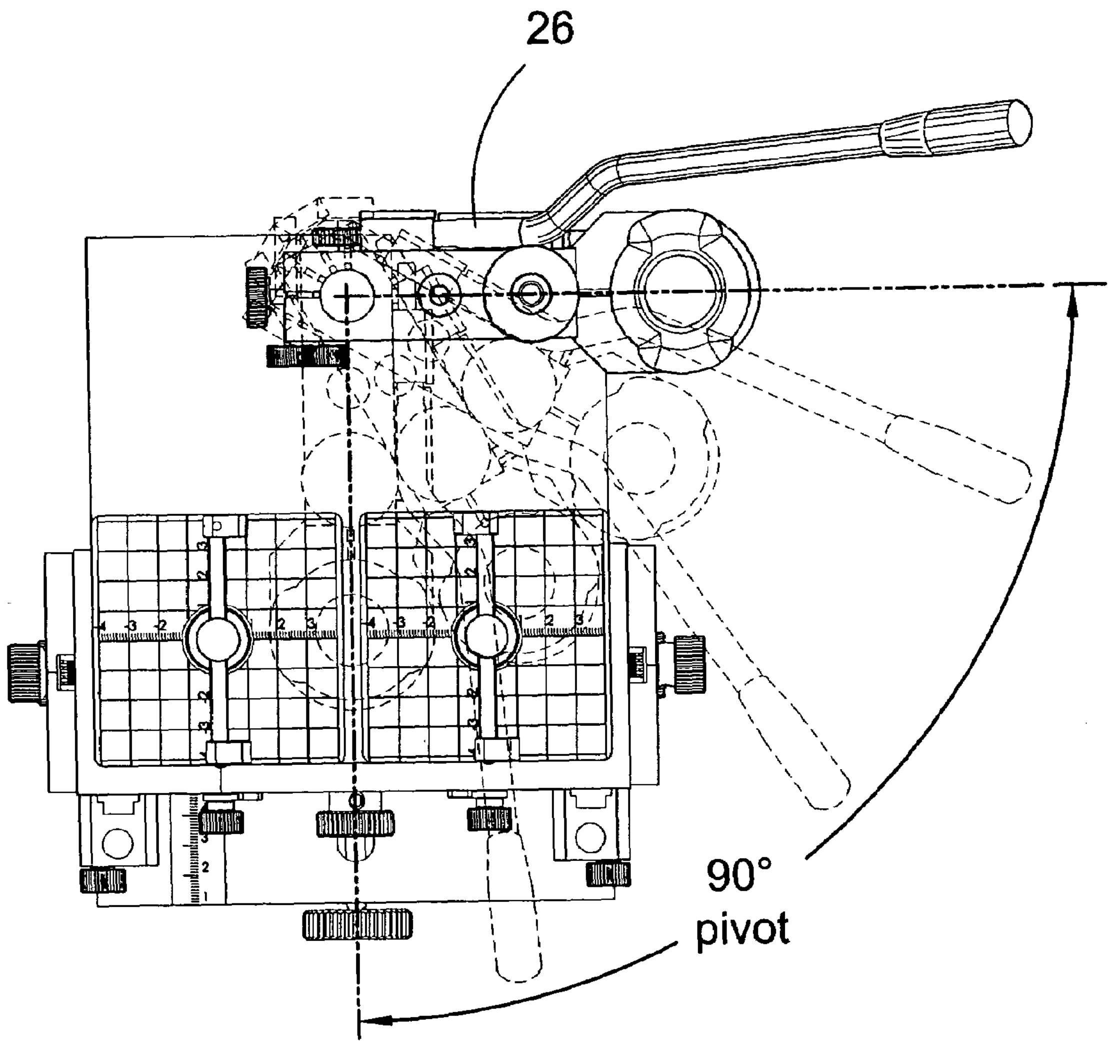

FIG. 17 is a top view of the present invention.

DESCRIPTION OF THE REFERENCED NUMERALS

Turning now descriptively to the drawings, in which similar reference characters denote similar elements throughout the several views, the figures illustrate the Optical Lens Drill Press of the present invention. With regard to the reference numerals used, the following numbering is used throughout the various drawing figures.

10 Optical Lens Drill Press
12 drilling assembly
14 lateral oscillation assembly
16 upper shift assembly
17 sidewalls of 16
18 lower shift assembly
20 base
21 drill stanchion
22 lens holding assembly
24 lens pedestal of 14
26 lens clamp
27 lens clamp head
28 lens clamp knob
30 threaded lens clamp shaft
32 transverse brace of 22
34 threaded recess of 32
36 front support post
38 rear support post
40 lateral oscillating table
41 rocker assembly
42 drill
43 drill bit
46 adjustment dials
48 optical lens
50 milling cutter
52 drilled recess
54 milled slot
56 armature

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
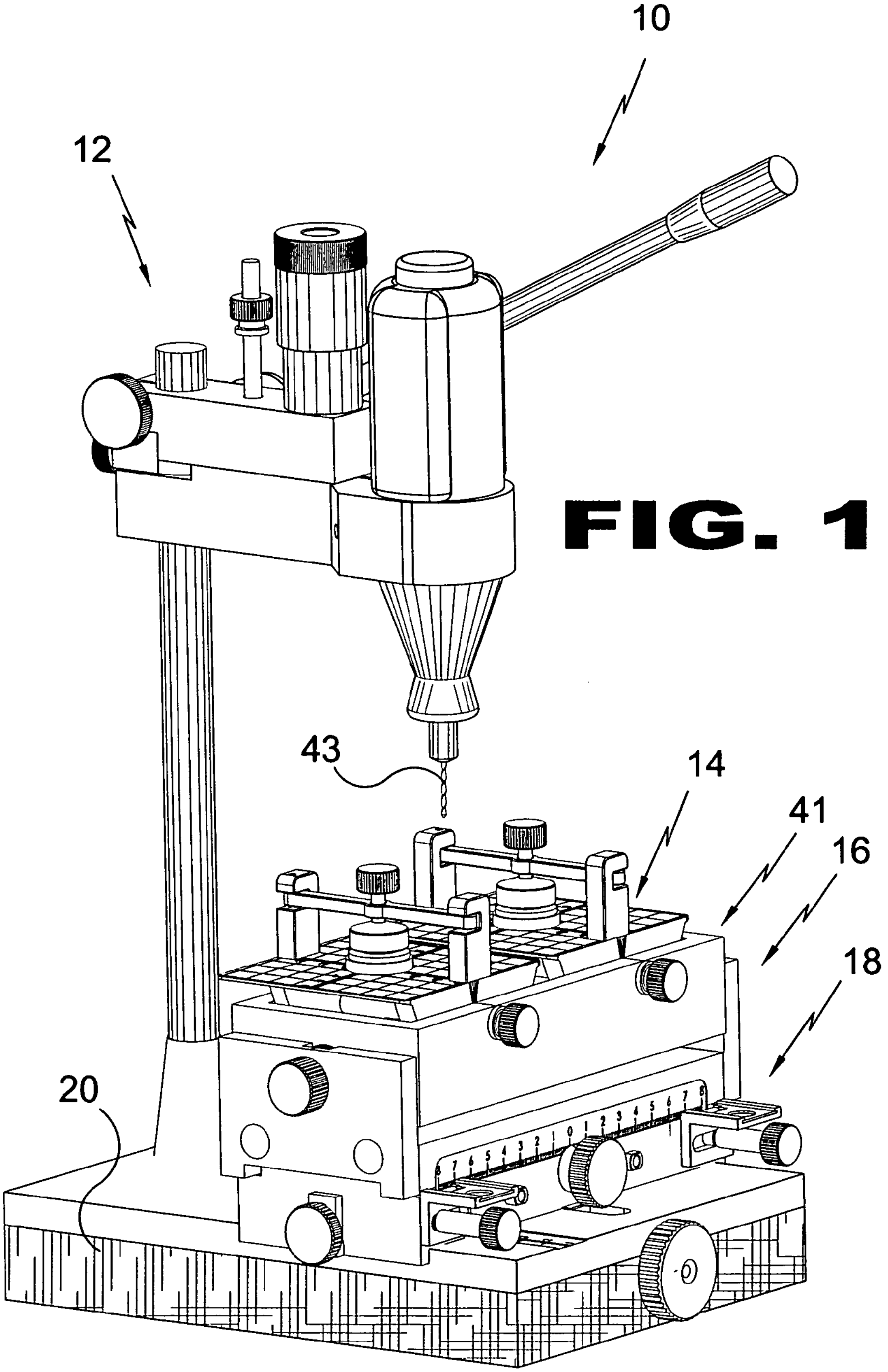
FIG. 1 is an illustrative view of the present invention.

FIG. 1 is an illustrative view of the present invention 10. The present invention 10 being an eyeglass lens drill press 10 outfitted with a specialized lens holding 14 and displacement assembly mounted on the base 20 of the drill press assembly 12 that allows for the user to manipulate and angle a held lens in a position, whereby selected areas pre-designated for the fabrication of holes or apertures can be produced by a drill bit 43 at precision angles and sizes typically perpendicular to the curvature of the lens. The target point to be drilled is position under the drill bit 43 by adjusting the y-axis with the lower shift assembly 18 and the x-axis with the upper shift assembly 16 accordingly and the arcuate surface of the lens is placed in perpendicular relation the the drill bit 43 by rotating the y-axis with the rocker assembly 16 and the x-axis with the lateral oscillating shift assembly 14.

Figure 2:
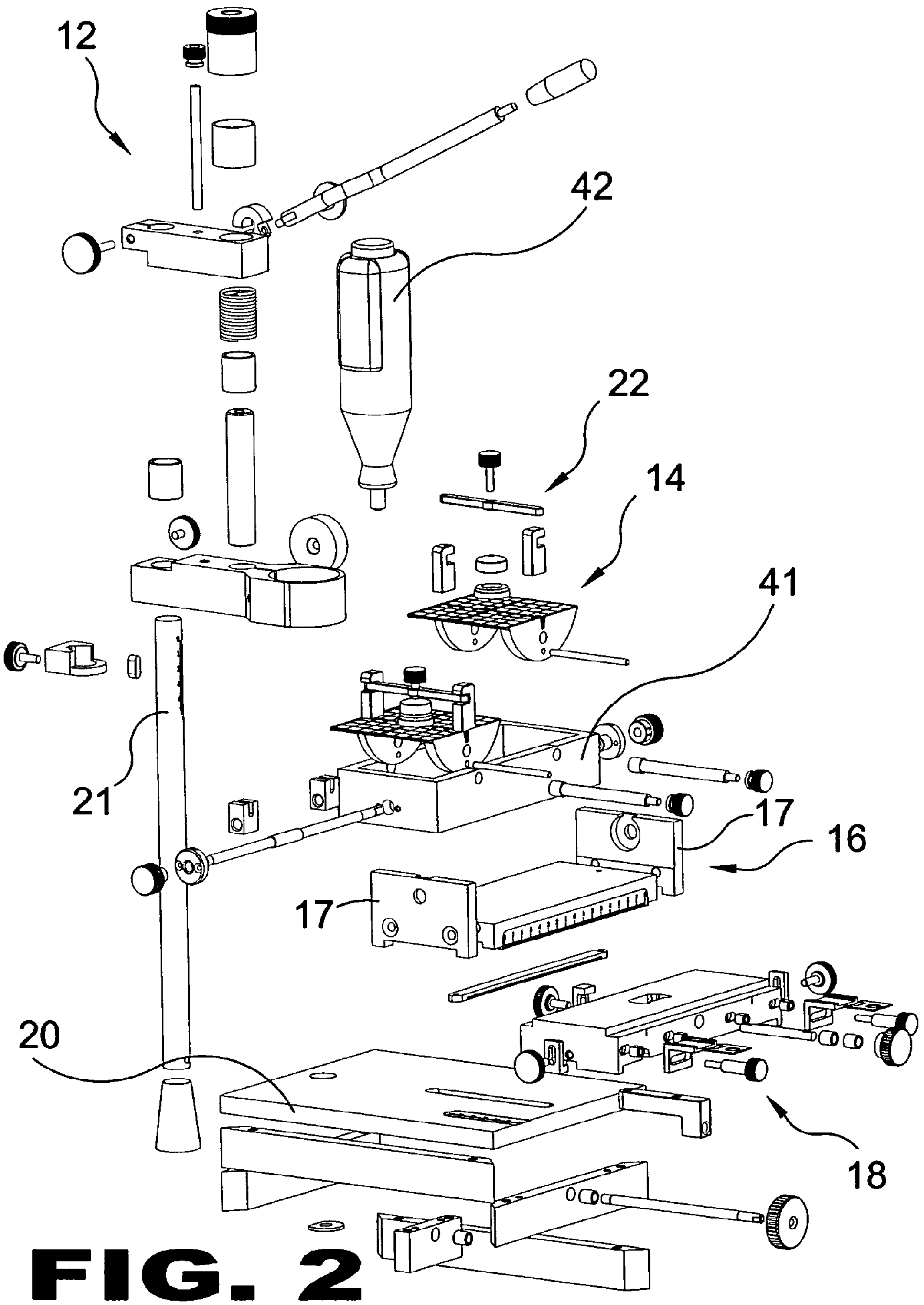
FIG. 2 is an exploded perspective view of the present invention.

FIG. 2 is an exploded perspective view of the present invention 10. Shown are the components and assemblies of the present invention 10 broken down into their individual parts to depict the way in which and how the present invention 10 may be constructed so as to provide an optical lens drill press 10 precise rotational capacity. The drill press assembly 12 is mounted on a stanchion 21 attached to a base member 20 with the drill 42 substantially disposed thereabove. The lower shift assembly 18 is mounted on said base member in a manner to permit it and all related components mounted thereon to selectively be incrementally positioned along the y-axis of said base 20 as needed and then locked into that position. The upper mounting assembly 18 is similarly mounted on said lower mounting assembly 16 to provide for travel along the x-axis. A rocker assembly 41 is pivotally attached to the sidewalls 17 of the upper shift assembly 16 thereby providing the axial rotation of the rocker assembly 41 and all related components mounted thereon along the y-axis. Two lens holding assemblies 22 are provided to retain the lens or lenses to be drilled on lateral oscillating shift assemblies 14 pivotally mounted in said rocker assembly 41.

Figure 3:
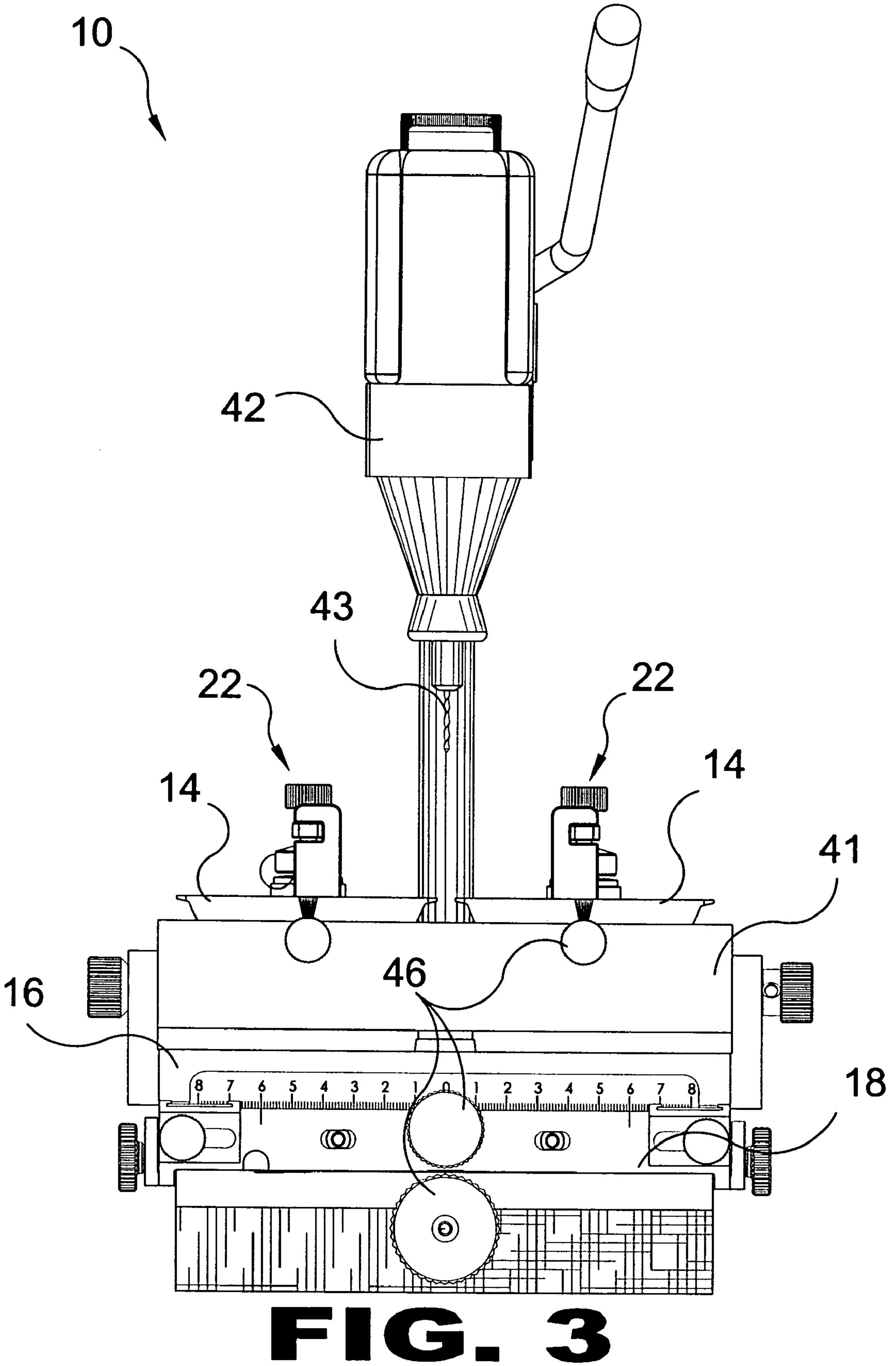
FIG. 3 is a front view of the present invention.

FIG. 3 is a front view of the present invention 10. Depicted is a front view of the present invention 10 depicting a drilling assembly 12 suspended above a pair of lens holding assemblies 22 and lateral oscillating shift assemblies 14, a rocker assembly 41, an upper shift assembly 16 and a lower shift assembly 18 capable of moving and orientating an eyeglass lens anywhere along an x, y, or z axis, and of lateral side to side oscillation enabling the user to position the drill 42 and drill bit 43 relative to the lens at any conceivable location or angle. A plurality of adjustment dials 46 are provided to incrementally move each component to the desired position.

Figure 4:
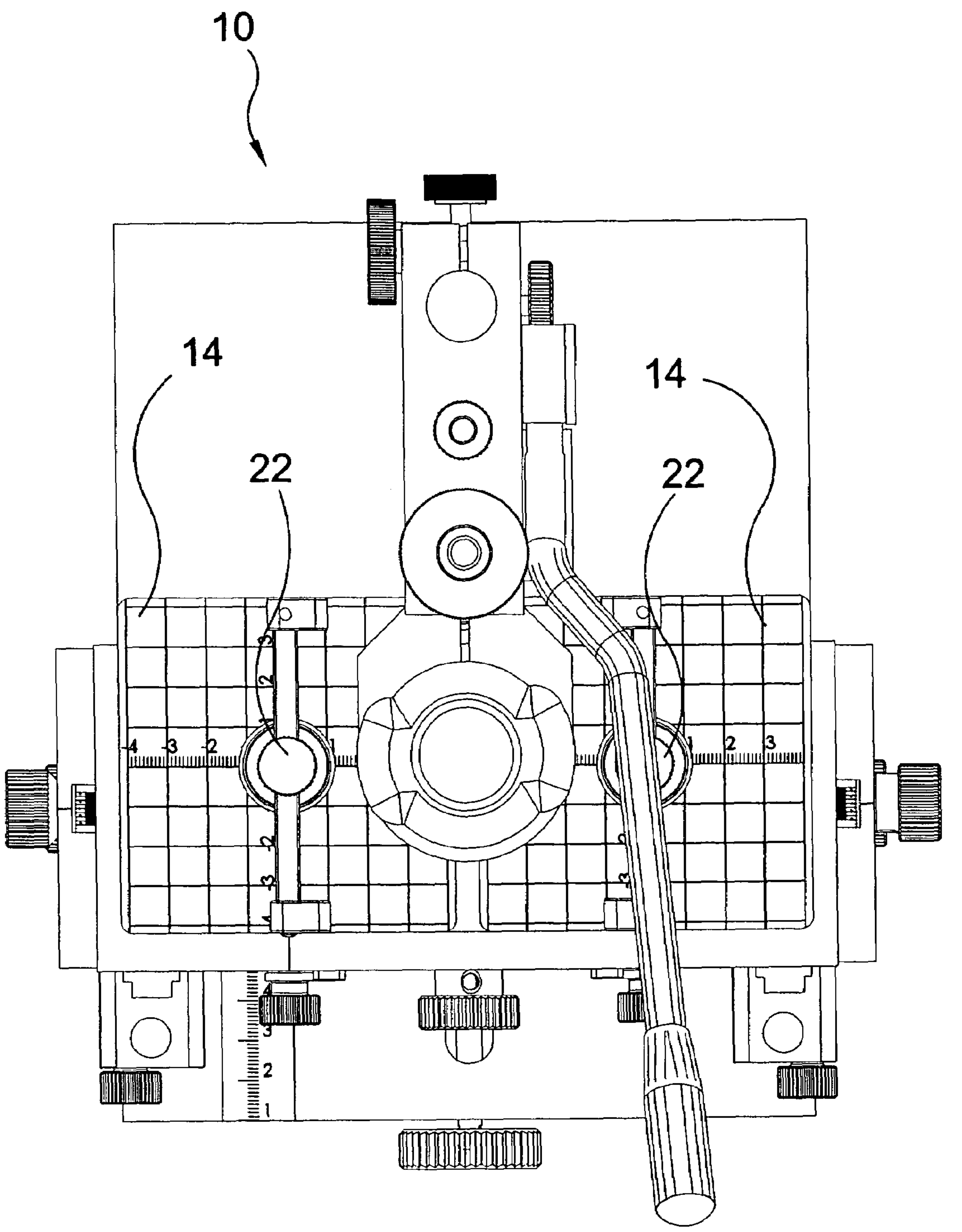
FIG. 4 is a top view of the present invention.

FIG. 4 is a top view of the present invention 10. Shown is the top of the present invention depicting the lens holding assemblies 22 on the lateral oscilating shift assemblies 14 used for the retention and securement of eyeglass lens during the drilling process.

Figure 5:
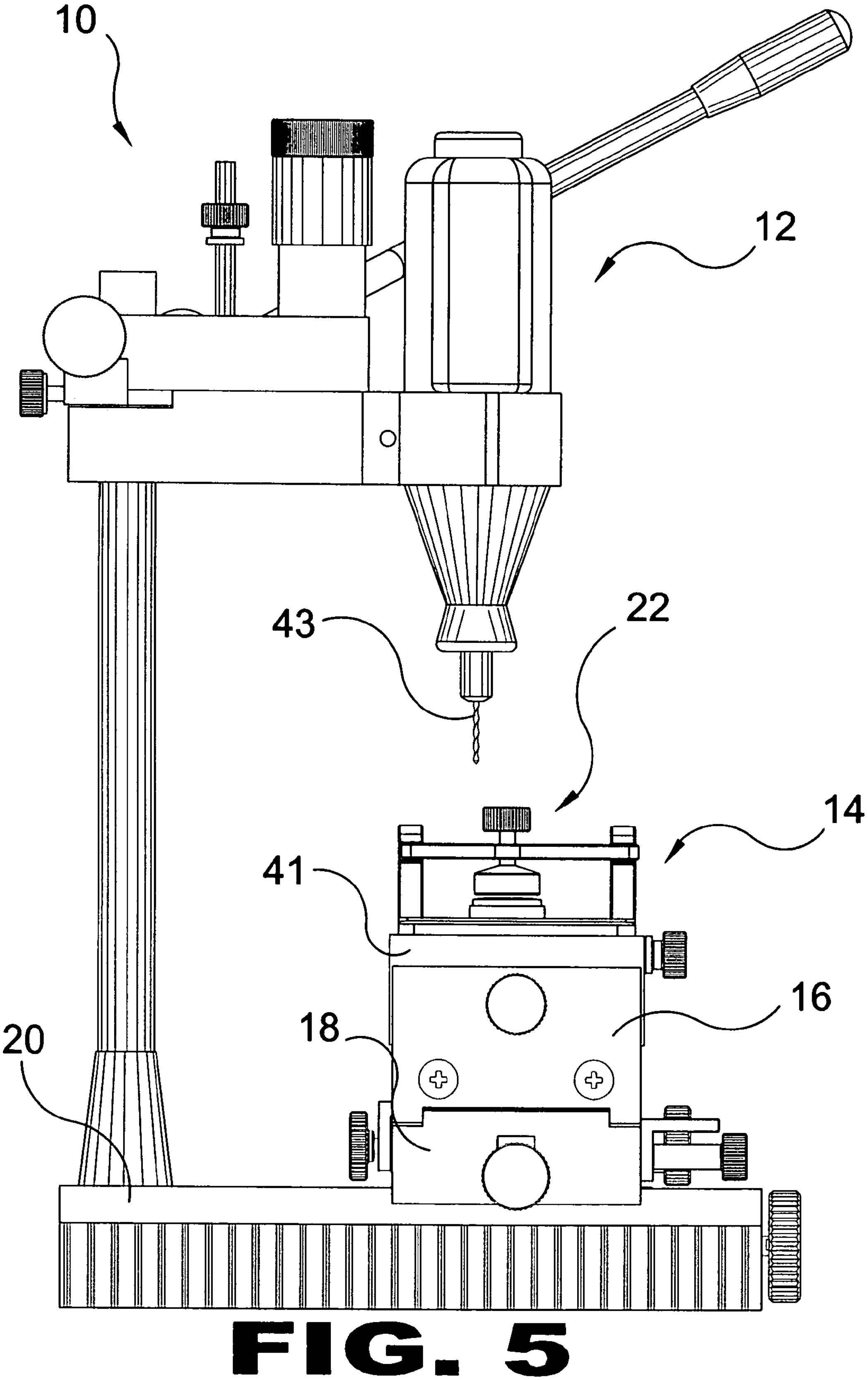
FIG. 5 is a right side view of the present invention.

FIG. 5 is a side view of the present invention 10. Shown is the present is the drill assembly 12 with a drill bit 43 installed therein positioned above a lens holding assembly 22 on a lateral oscillating shift assembly 14 pivotally disposed within a rocker assembly 41 that is pivotally mounted on the sidewalls of the upper shift assembly 16 that is slidably engaged with the lower shift assembly 18 which is slidably mounted on the base member 20.

Figure 6:
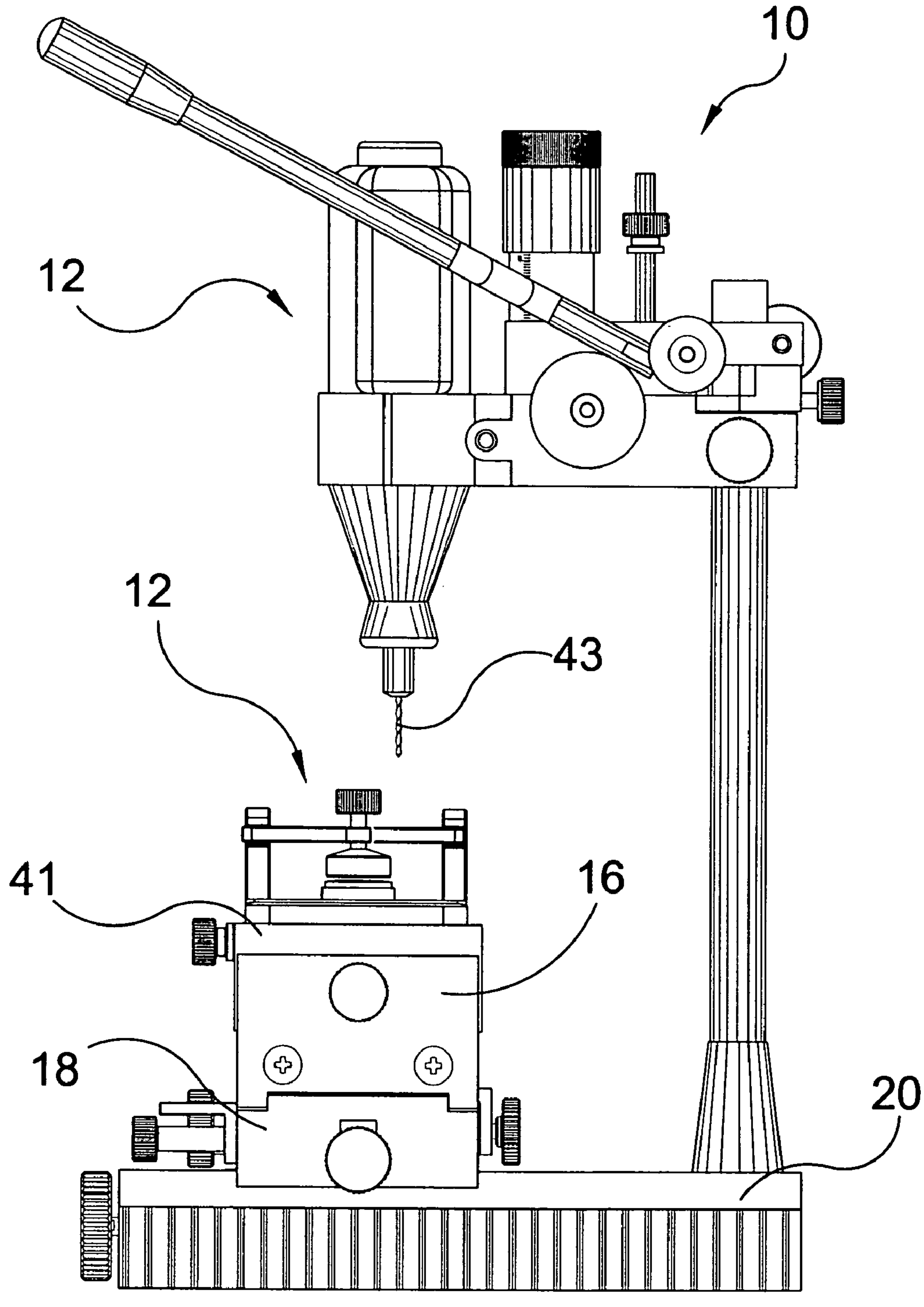
FIG. 6 is a left side view of the present invention.

FIG. 6 is a left side view of the present invention 10. Shown is the present is the drill assembly 12 with a drill bit 43 installed therein positioned above a lens holding assembly 22 on a lateral oscillating shift assembly 14 pivotally disposed within a rocker assembly 41 that is pivotally mounted on the sidewalls of the upper shift assembly 16 that is slidably engaged with the lower shift assembly 18 which is slidably mounted on the base member 20.

Figure 7:
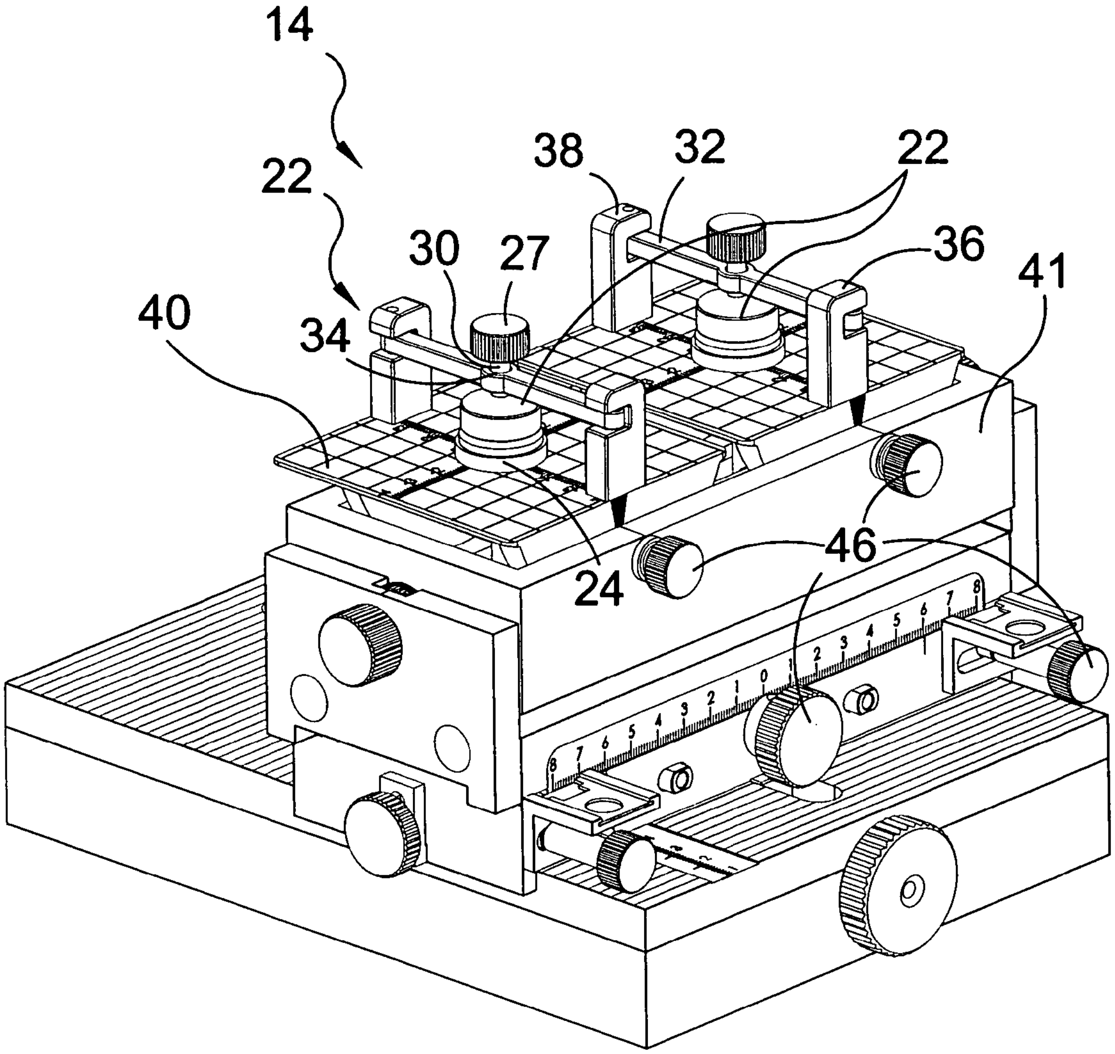
FIG. 7 is a perspective view of the present invention's centering platform.

FIG. 7 is a perspective view of the present invention's centering platform. Shown is a detailed view of the platform of the present invention 10, depicting a plurality of lateral oscillating assemblies 14 with lens holding elements 22 thereon coupled to a rocker assembly 41 pivotally connected to the sidewalls 17 of the upper shift assembly 16 that allows a lens held by the lens holding assembly 22 to be moved to a respective angle and orientation whereby when drilled, the holes created are perpendicular to the curvature of the lens. The lens holding assembly 14 comprises a lens pedestal 24 centrally disposed on the lateral oscillation table 40 and a lens clamp 26 having a lens clamp knob 28 communicating with a lens clamp head 27 via a threaded shaft 30 threaded into a threaded recess 34 in a transverse brace 32 suspended by a front support post 36 and a rear support post 38.

Figure 8:
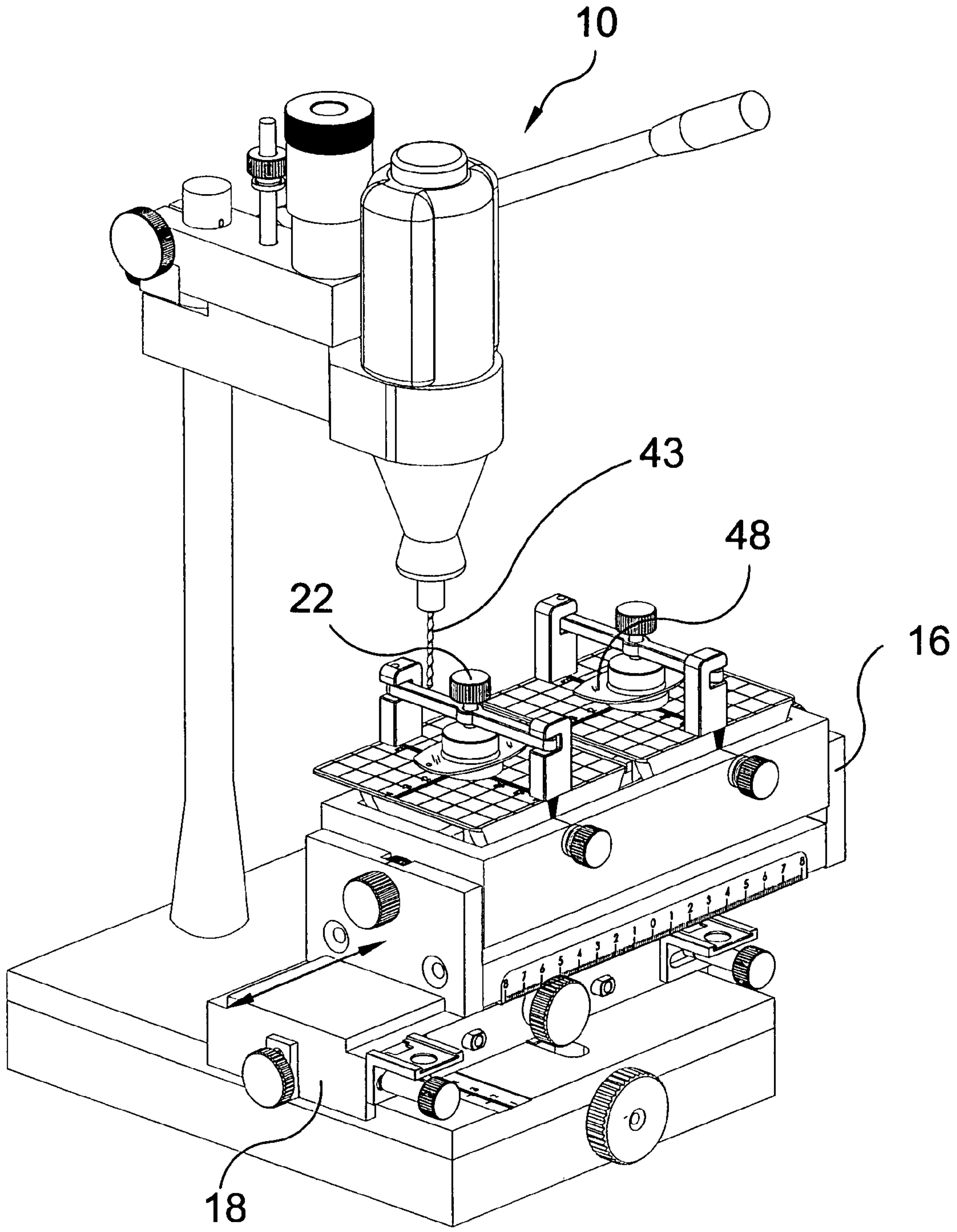
FIG. 8 is a perspective view of the present invention's centering platform x-axis travel.

FIG. 8 is a perspective view of the present invention's 10 centering platform x-axis travel. Shown is the present invention 10 having an eyeglass lens 48 mounted in between the holding elements 22 for later drilling. Additionally shown is the method by which the present invention 10 moves the lens 48 into place traveling along the x axis by sliding the upper shift assembly 18 to the left or right over the lower shift assembly's 16 top surface until a desired position is secured.

Figure 9:
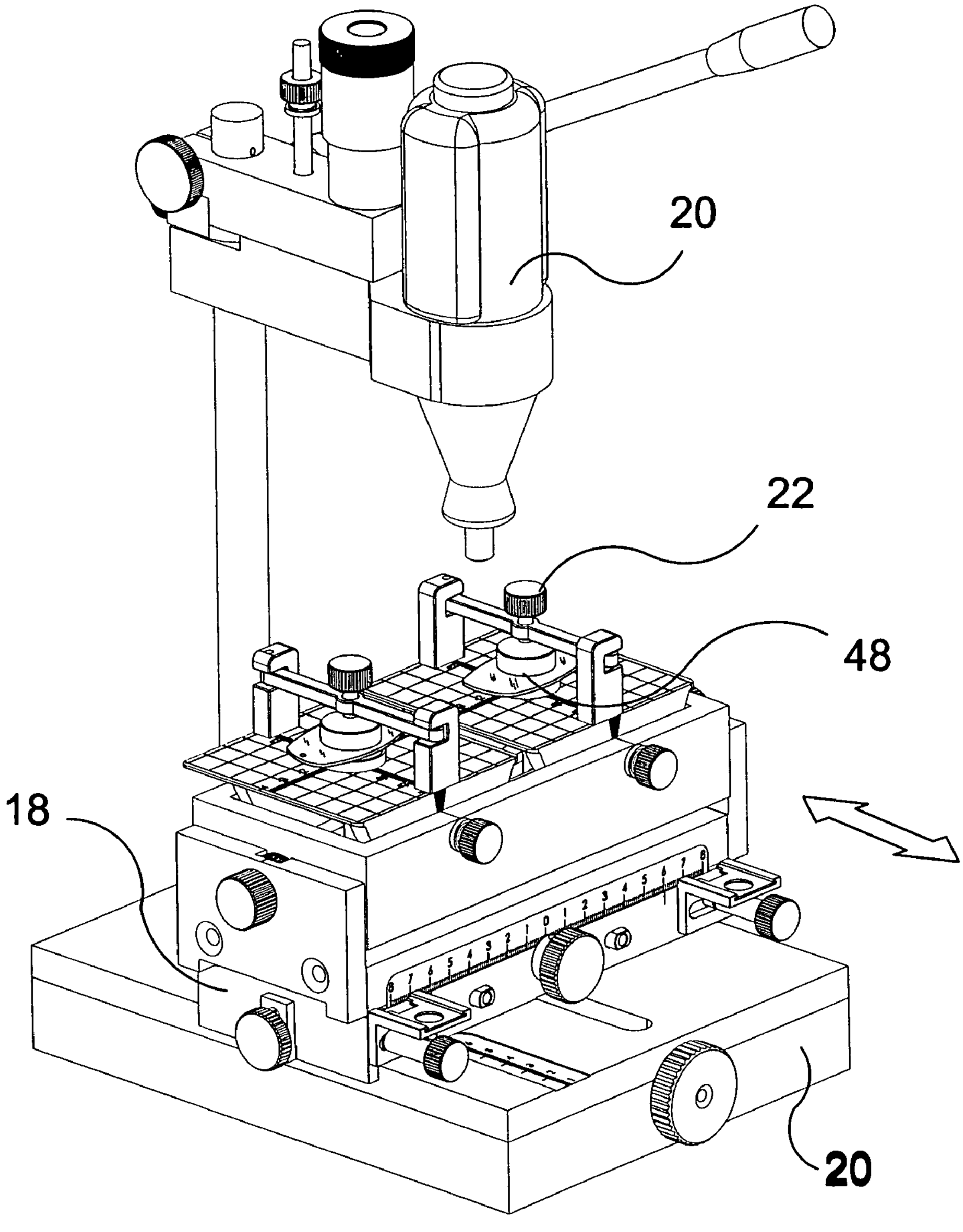
FIG. 9 is a perspective view of the present invention's centering platform y-axis travel.

FIG. 9 is a perspective view of the present invention's 10 centering platform y-axis travel. Shown is the present invention 10 having optical lenses 48 mounted in holding elements 22 for later drilling. Additionally shown is the method by which the present invention moves the lens 48 into place traveling along the y-axis by sliding the lower shift assembly 18 to the front or back over the base's 20 top surface until a desired position is secured.

Figure 10:
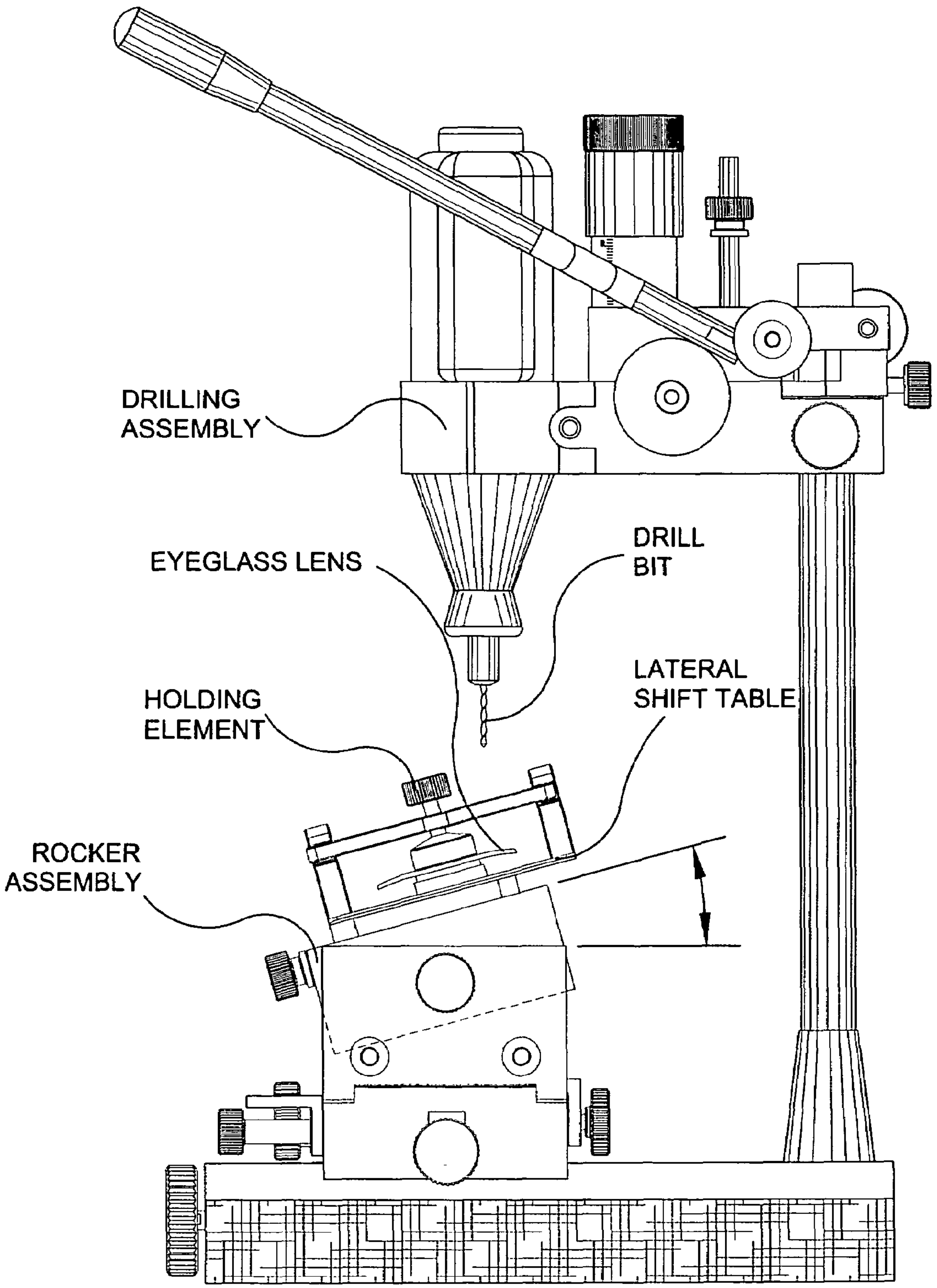
FIG. 10 is a side view of the present invention's centering platform z-axis pivot.

FIG. 10 is a side view of the present invention's 10 centering platform z-axis pivot. Shown is the present invention 10 having optical lenses 48 mounted within the holding element 22 whereby the angle of incidence of the lens 48 relative to the drill bit 43 in the drilling assembly 12 may be changed via adjustment of the rocker assembly 41 in a forward tilt. The angle adjustment allows the user to drill holes perpendicular to the arcuate surface and structure of the lens 48.

Figure 11:
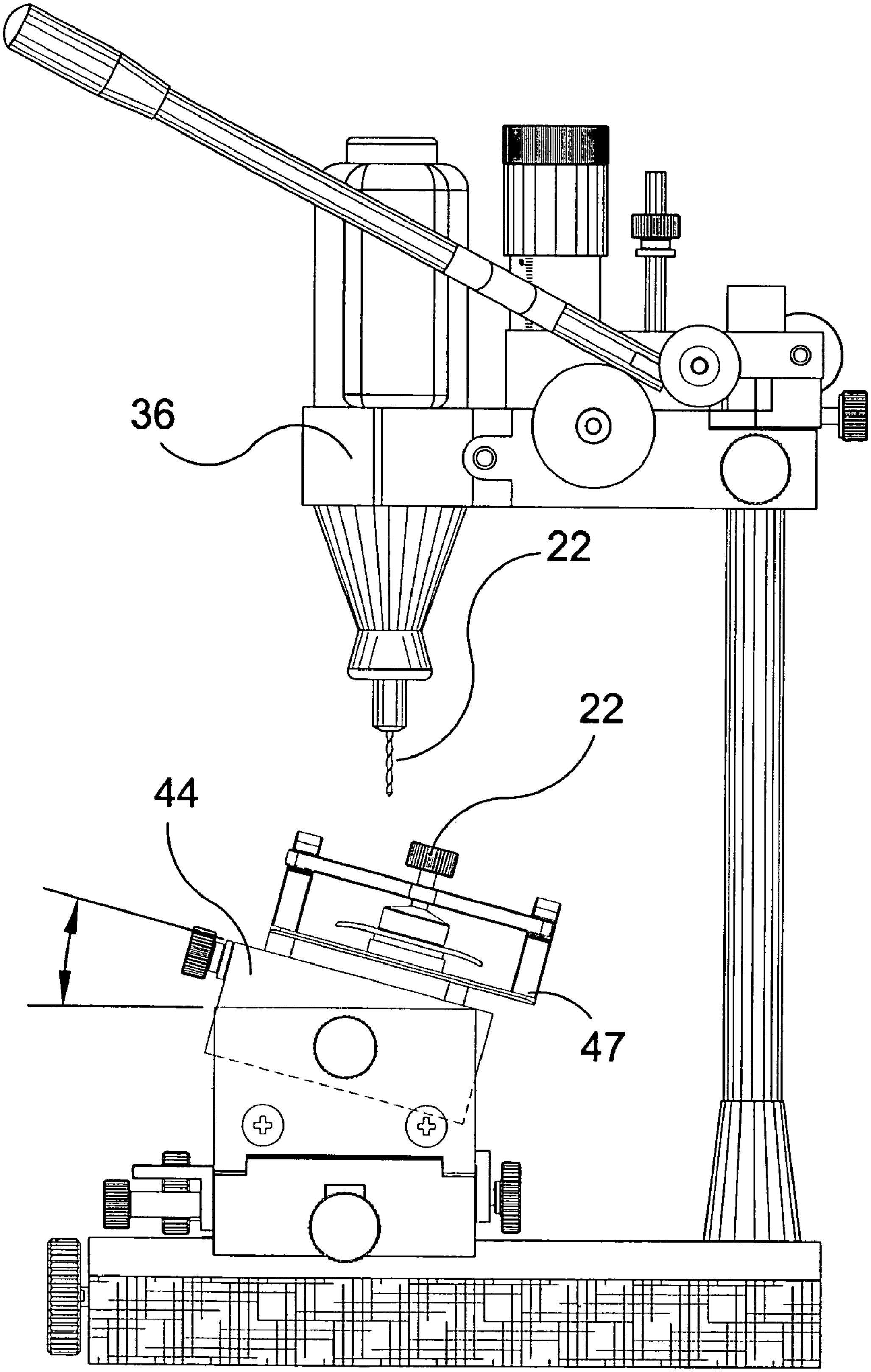
FIG. 11 is a side view of the present invention's centering platform z-axis pivot.

FIG. 11 is a side view of the present invention's 10 centering platform z-axis pivot. Shown is the present invention 10 having eyeglass lenses 48 mounted within the holding element 22 whereby the angle of incidence of the lens 48 relative to the drill bit 43 in the drilling assembly 12 may be changed via adjustment of the rocker assembly 41 in a backward tilt. The angle adjustment allows for the user to drill holes perpendicular to the arcuate surface and structure of the lens 48.

FIG. 12 is a front view of the present invention's 10 centering platform x-axis pivot. Shown is the present invention 10 having eyeglass lenses 48 mounted in the holding elements 22 and being tilted inward by means of the user manipulating the lateral oscillating shift tables 40 inward so that the area of the lens 48 to be drilled is perpendicular to the drill bit 43.

FIG. 13 is a front view of the present invention's 10 centering platform x-axis pivot. Shown is the present invention 10 having optical lenses mounted in the holding elements 22 and being tilted outward by means of the user manipulating the lateral oscillating shift tables 40 outward so that the area of the lens 48 to be drilled is perpendicular to the drill bit 43.

FIG. 14 is an exploded view of the lens holding elements 22 and lenses 48. The lens holding assembly 14 comprises a lens pedestal 24 centrally disposed on the lateral oscillation table 40 and a lens clamp 26 having a lens clamp knob 28 communicating with a lens clamp head 27 via a threaded shaft 30 threaded into a threaded recess 34 in a transverse brace 32 suspended by a front support post 36 and a rear support post 38.

FIG. 15 is a detailed view of the drilling process of the present invention. Shown is the present invention having an eyeglass lens 48 being held in position relative to the drill bit 43 by the holding element 22 in a position that cooperates with the orientation of the lateral oscillating shift table 14 to produce a hole drilled into the lens that is perpendicular to the arc of the lens 48 surface and structure.

FIG. 16 is a detailed view of the cutting process of the present invention. Shown is the present invention having an eyeglass lens 48 being held in position relative to the milling cutter 60 by the holding element 22 in a position that cooperates with the orientation of the lateral oscillating table 40 to produce the result of an milled slot 52 being cut into the lens 48 that is perpendicular to the arc of the lens's 48 surface and structure. The user turns the adjustment knob for the upper shift assembly to move the lens 48 back and forth as the spinning milling bit 50 cuts the aperture.

FIG. 17 is a top view of the present invention 10. The illustration depicts the pivotal swing of the drill press assembly 12 on a rotatable armature 56. The drill press assembly 12 is pivotal about the vertical stanchion 21 to allow for improved accessibility to the holding platforms. The drill press assembly 12 is rotated away from the platform to provide the user means for loading and unloading of the optical lenses. A turn knob allows the drill 12 to pivot freely when disengaged and locks the drill 12 in a fixed position when engaged. A positioning block with a milled groove ensures the drill is centered over the holding platforms allowing proper working position.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An optical lens drill press comprising:

a) a drill press comprising:

i) a base member;

ii) an adjustable stanchion extending perpendicularly upward from said base;

iii) a drill for retaining a bit in the bottom portion thereof perpendicularly oriented towards said base member;

iv) means for retaining said drill extended from an upper portion of said stanchion and in parallel relation therewith; and v) means for selectively lowering said drill to act upon a workpiece;

b) a lower shift assembly slidably engaged with said base member in a manner to permit it to be selectively and precisely positioned along the y-axis of said base member and temporarily locked into that position;

c) an upper shift assembly slidably engaged with said lower shift assembly in a manner to permit it to be selectively and precisely positioned along the x-axis of said base and temporarily locked into that position, said upper shift assembly including two vertical opposing sidewalls;

d) a rocker assembly rotatably disposed between and secured to said sidewalls of said upper shift assembly having means for selectively and precisely being rotated along the y-axis and temporarily locked into that position; and e) at least one lateral oscillation assembly comprising:

i) a planar lateral oscillation table;

ii) means for retaining a workpiece above said lateral oscillation table; and iii) means for selectively and precisely rotating said lateral oscillation table along the x-axis and temporarily securing it into that position.

2. An optical lens drill press as recited in claim 1, wherein said workpiece is an optical lens.

3. An optical lens drill press as recited in claim 2, wherein said means for retaining said optical lens is a lens holding assembly comprising:

a) a padded lens pedestal disposed on said lateral oscillation table;

b) a front support post and a rear support post disposed on opposite sides of said lens pedestal;

c) a transverse brace parallel with said lateral oscillation table and suspended thereabove by the upper portions of said front support post and said rear support post, said transverse brace having a vertically disposed threaded recess positioned above said lens pedestal; and d) a lens clamp comprising a lens clamp knob disposed above said transverse brace, a lens clamp head disposed beneath said transverse brace and a threaded shaft communicating between said lens clamp knob and said lens clamp head and extending through said threaded recess of said transverse brace.

4. An optical lens drill press as recited in claim 3, wherein said optical lens is placed on said lens pedestal with an area to be worked disposed beyond a peripheral edge thereof and said lens clamp knob is rotated to lower said lens clamp head to sandwich said lens between said pedestal and said lens clamp head to prevent said lens from shifting while being worked.

5. An optical lens drill press as recited in claim 1, wherein said lower shift assembly further includes an adjustment dial for incrementally moving said lower shift assembly along the y-axis and securing it at that position until said adjustment dial is further acted upon.

6. An optical lens drill press as recited in claim 5, wherein said base member further includes a ruled scale for determining the position of said lower shift assembly on the y-axis thereof.

7. An optical lens drill press as recited in claim 5, wherein an area to be drilled is aligned with said drill bit by appropriately positioning said lower shift assembly along the y-axis.

8. An optical lens drill press as recited in claim 1, wherein said upper shift assembly further includes an adjustment dial for incrementally moving upper shift assembly along the x-axis and securing it at that position until said until said adjustment dial is further acted upon.

9. An optical lens drill press as recited in claim 8, wherein said upper shift assembly further includes a ruled scale for determining the position of said upper shift assembly on the x-axis relative to said lower shift assembly.

10. An optical lens drill press as recited in claim 9, wherein an area to be drilled is aligned with said drill bit by appropriately positioning said upper shift assembly along the x-axis.

11. An optical lens drill press as recited in claim 10, wherein the an to be drilled is perpendicularly aligned with said drill bit by adjusting the rocker assembly along the y-axis.

12. An optical lens drill press as recited in claim 10, wherein the area to be drilled is perpendicularly aligned with said drill bit by adjusting the the lateral oscillation assembly along the x-axis as need to compensate for the curvature of said lens.

13. An optical lens drill press as recited in claim 1, wherein said rocker assembly retains a pair of lateral oscillation assemblies side-by-side.

14. An optical lens drill press as recited in claim 1, wherein said drilling assembly further includes a pivoting armature connecting said drill to said stanchion.

* * * * *